US009742335B2

(12) United States Patent
Mandelj

(10) Patent No.: US 9,742,335 B2
(45) Date of Patent: Aug. 22, 2017

(54) MODULAR MULTI-PHASE ELECTRIC MACHINE

(71) Applicant: GEM MOTORS D.O.O., Kamnik (SI)

(72) Inventor: Simon Mandelj, Smartno pri Litiji (SI)

(73) Assignee: GEM MOTORS D.O.O., Kamnik (SI)

( * ) Notice: Subject to any disclaimer, the term of this patent is extended or adjusted under 35 U.S.C. 154(b) by 0 days.

(21) Appl. No.: 14/897,438

(22) PCT Filed: Jun. 6, 2014

(86) PCT No.: PCT/EP2014/061831
§ 371 (c)(1),
(2) Date: Dec. 10, 2015

(87) PCT Pub. No.: WO2014/198663
PCT Pub. Date: Dec. 18, 2014

(65) Prior Publication Data
US 2016/0134220 A1    May 12, 2016

(30) Foreign Application Priority Data
Jun. 11, 2013  (SI) ................... 201300154

(51) Int. Cl.
*H02P 6/14*        (2016.01)
*H02P 25/22*       (2006.01)
*H02K 3/28*        (2006.01)
(52) U.S. Cl.
CPC .............. *H02P 25/22* (2013.01); *H02K 3/28* (2013.01); *B60L 2220/58* (2013.01);
(Continued)

(58) Field of Classification Search
CPC ............ H02P 29/032; H02P 6/12; H02P 6/22
See application file for complete search history.

(56) References Cited

U.S. PATENT DOCUMENTS

2002/0018823 A1    2/2002  Ito
2003/0085627 A1    5/2003  Lipo et al.
(Continued)

FOREIGN PATENT DOCUMENTS

CN    102868343 A    1/2013
EA    200802369 A1   8/2009
(Continued)

*Primary Examiner* — Karen Masih
(74) *Attorney, Agent, or Firm* — Murphy, Bilak & Homiller, PLLC

(57) ABSTRACT

A multi-phase electric motor is proposed that comprises a rotor and a stator. The rotor has a number of magnets directed towards the stator and the stator includes a plurality of phase windings directed towards the magnets. The phase windings are connected to control units that are adapted to selectively apply a current to the phase windings to induce an electromagnetic force which acts upon the magnets to effect a rotation of the rotor. The motor comprises at least two control units, each being configured to control the supply of current to three phase windings such that a different phase current is supplied to each of the three phase windings with a phase shift between said different phase currents being 120°, and wherein no two control units utilize the same current phase. By distributing current over at least six phases and utilizing two or more control units operating as simple 3-phase motors, low voltage operation is enabled without the associated disadvantages of high winding currents, while control is simplified over conventional systems.

13 Claims, 4 Drawing Sheets

(52) U.S. Cl.
CPC ....... *H02P 2207/076* (2013.01); *Y02T 10/641* (2013.01); *Y02T 10/642* (2013.01)

(56) References Cited

U.S. PATENT DOCUMENTS

| | | |
|---|---|---|
| 2007/0241699 A1 | 10/2007 | Osada et al. |
| 2011/0057591 A1 | 3/2011 | Tagome et al. |
| 2011/0101906 A1 | 5/2011 | Tagome |
| 2011/0163708 A1 | 7/2011 | Mukai et al. |
| 2012/0049782 A1 | 3/2012 | Suzuki et al. |
| 2013/0076189 A1 | 3/2013 | Kolomeitsev |
| 2016/0036359 A1* | 2/2016 | Nagata .................. H02P 29/68 318/400.1 |

FOREIGN PATENT DOCUMENTS

| | | |
|---|---|---|
| GB | 2462940 A | 3/2010 |
| JP | 2009291040 A | 12/2009 |
| JP | 2010226899 A | 10/2010 |
| JP | 2011142744 A | 7/2011 |
| RU | 1464279 A1 | 3/1989 |
| WO | 2004073157 A2 | 8/2004 |
| WO | 2009144957 A1 | 12/2009 |
| WO | 2010119662 A1 | 10/2010 |

\* cited by examiner

Fig. 2a
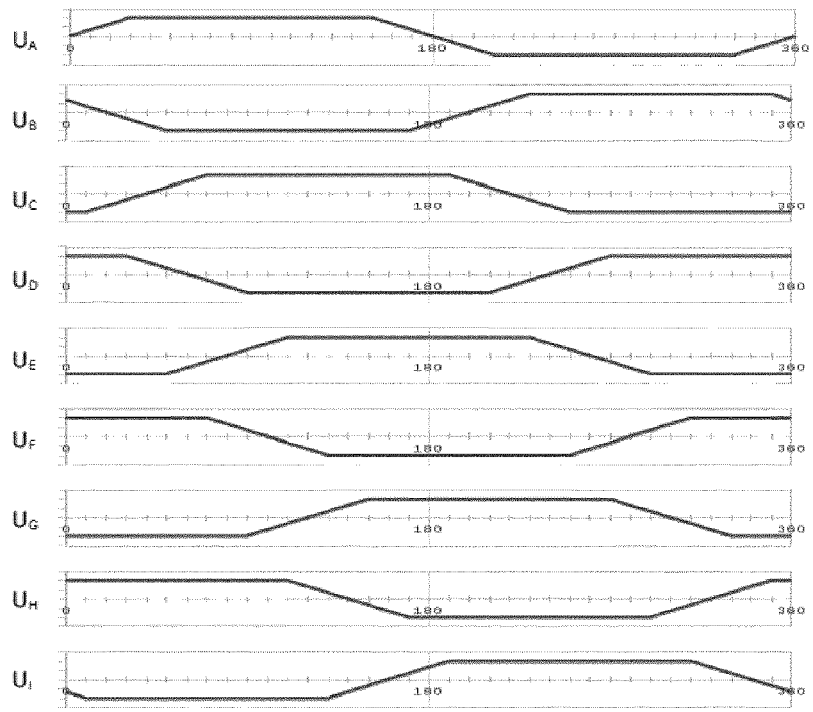
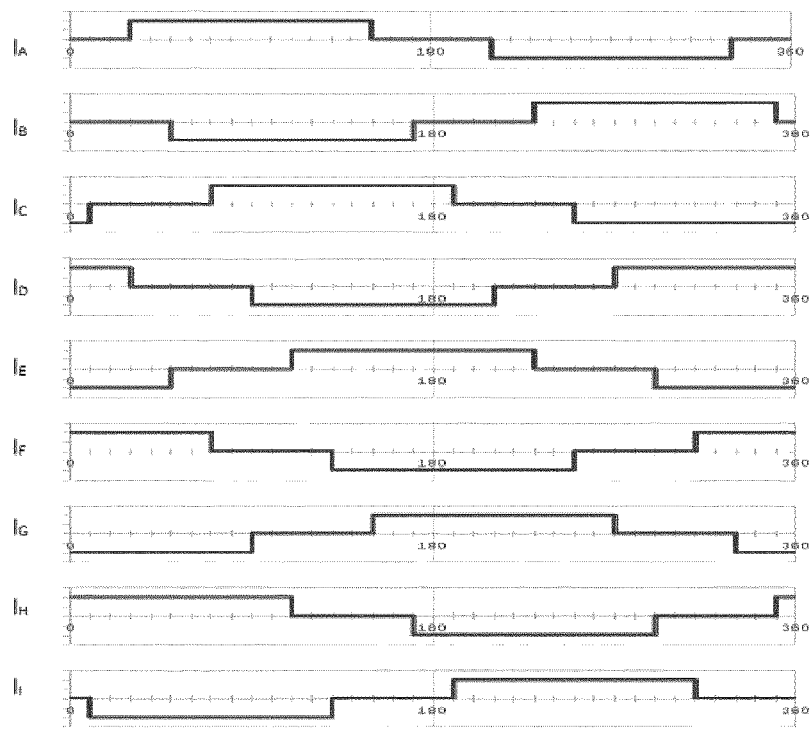
Fig. 2b

MODULAR MULTI-PHASE ELECTRIC MACHINE

TECHNICAL FIELD

The present invention relates to electric machines and in particular to multi-phase electric motors for use in a wheel hub of an electric vehicle.

BACKGROUND

Electrically powered vehicles require electric motors that are simple, safe, highly efficient and provide good performance. Electric motors generally fall into one of two types, those with a high operating voltage and those with a low operating voltage (typically 50 V or less). High voltage electric motors clearly pose a greater risk of electric shock to people and animals when used in a vehicle and are thus subject to stringent safety requirements, which render them a complex and consequently high cost solution. In order to provide the same power, low-voltage motors require a higher operating current, since power is the product of current and voltage. However, operating conventional low voltage three-phase electric motors with high winding currents poses several problems including the need for larger cables and connectors a more complex controller for high current switching, larger capacitance requirements and low inductance. In addition, the heat losses or copper losses (coil resistance×coil current squared), due to the resistance of the windings become significant.

WO 2004073157 describes a low-voltage electric motor with distributed winding intended to address this problem. In this motor the total current is distributed across several coils or windings which significantly reduce the winding current. However, each coil is controlled separately which requires a complex controller with a large amount of electronics. A low voltage in-wheel three-phase electric motor is also described in GB2462940A. This motor has a number of independently controlled coil sets distributed around the stator. Each coil set is made up of three coil sub-sets, where each coil sub-set is driven at a different phase. However, the same three phases are used in each coil set. This arrangement provides some simplification over the disclosure of WO 2004073157, however, the controller is still complex as it requires an independent CPU controller for each coil set.

Thus, while it is known to provide low voltage and high current electric motors, there is a need to provide such motors in a simple and cost effective way that does not compromise on high performance.

SUMMARY

The above and other objects are achieved in a multi-phase electric motor comprising a rotor and a stator, wherein the rotor comprises a number of magnets directed towards the stator, and wherein the stator includes a plurality of phase windings arranged around a circumferential surface of the stator and directed towards the magnets, the phase windings being connected to control units adapted to selectively apply a current to the phase windings to induce an electromagnetic force which acts upon the magnets of the rotor to effect a rotation of the rotor The motor comprises at least two control units, and each control unit is configured to control the supply of current to three phase windings such that a different phase current is supplied to each of the three phase windings with a phase shift between the different phase currents being 120°. Moreover, no two control units utilise the same current phase.

By utilising two or more control units, each essentially operating as simple 3-phase controllers controlling current phases that are separated by 120°, yet each controlling different phases from the other control unit or units, current can be distributed over at least six phases. Thus low voltage operation is enabled without the associated disadvantages of high currents and at the same time, control is vastly simplified over conventional systems.

Preferably, the phase windings are driven by one of m different current phases, where m is a multiple of 3 and at least equal to 6. It is then favourable when the phase shift between current phases is 360°/m In order to achieve optimal control it is particularly advantageous when the arrangement of phase windings around the circumferential surface of the stator is such that each phase winding is driven by a current that is shifted in phase by 180°+180°/m relative to the current in an adjacent phase winding. The control units are thus not connected to sequentially arranged phase windings. Instead, the phase windings of all coil units are interleaved. Hence when two control units are provided, the first control unit controls the first, third and fifth phase winding while the second control unit controls the second, fourth and sixth phase winding.

According to a particularly preferred embodiment of the invention, the phase windings controlled by a single control unit are selected from the sequence of phase windings as follows: if k is the number of control units controlling the supply of a total of m phase currents to phase windings, each of the k control modules is configured to control phase windings $i$, $i+m/3$, $i+m*\tfrac{2}{3}$, where i is an integer satisfying $1 \leq i \leq k$.

The three phase windings controlled by each control unit may be arranged either in a wye-configuration (Y-configuration) or in a delta configuration.

In accordance with a preferred embodiment of the present invention, each control unit comprises a 3-phase half bridge circuit configured to energise the phase windings preferably with a substantially rectangular current waveform.

This type of controller circuit is simply to construct or readily available and constitutes a simple but highly effective form of control. The control is particularly simple, when a rectangular waveform is used to drive the phase windings, as the controller circuit need only energies two of the three connected phase windings at any one time. Alternatively, the 3-phase half bridge circuit may be configured to use a substantially trapezoidal or sinusoidal current waveform.

In accordance with a further embodiment, at least one controller is arranged to control the operation of at least one control unit. In such an arrangement, the controllers for each control unit may be independent of one another or networked in some way to provide for an exchange of information.

In a preferred embodiment a central controller is arranged to control the operation of all control units in order to provide sufficient fine control to rotation of the rotor by controlling the sequence of application of each of the different phase currents to the phase windings.

The controller or controllers preferably utilise pulse width modulation.

In accordance with a further embodiment, each phase winding comprises one or more coil elements connected in parallel or series. Preferably, each phase winding comprises at least two coil elements that are distributed evenly around the circumferential surface of the stator.

In accordance with a further aspect, the invention is directed to an electrically powered vehicle with at least one wheel, comprising an in-wheel electric motor as described above.

BRIEF DESCRIPTION OF THE DRAWINGS

Further objects and advantages of the present invention will become apparent from the following description of the preferred embodiments that are given by way of example with reference to the accompanying drawings. In the figures:

FIG. 2a illustrates the induced voltage waveforms for sequentially arranged phase windings for each phase of the multi-phase electric motor, FIG. 2b illustrates driving current waveforms for of the sequentially arranged phase windings of the multi-phase electric motor, FIG. 3 schematically illustrates the 3-phase modular control arrangement for the multi-phase electric motor according to an embodiment the invention, FIG. 4 schematically illustrates a single 3-phase modular control unit, and FIG. 5 schematically illustrates the central control unit of the multi-phase electric motor according to an embodiment of the invention

DETAILED DESCRIPTION

Figure 1:
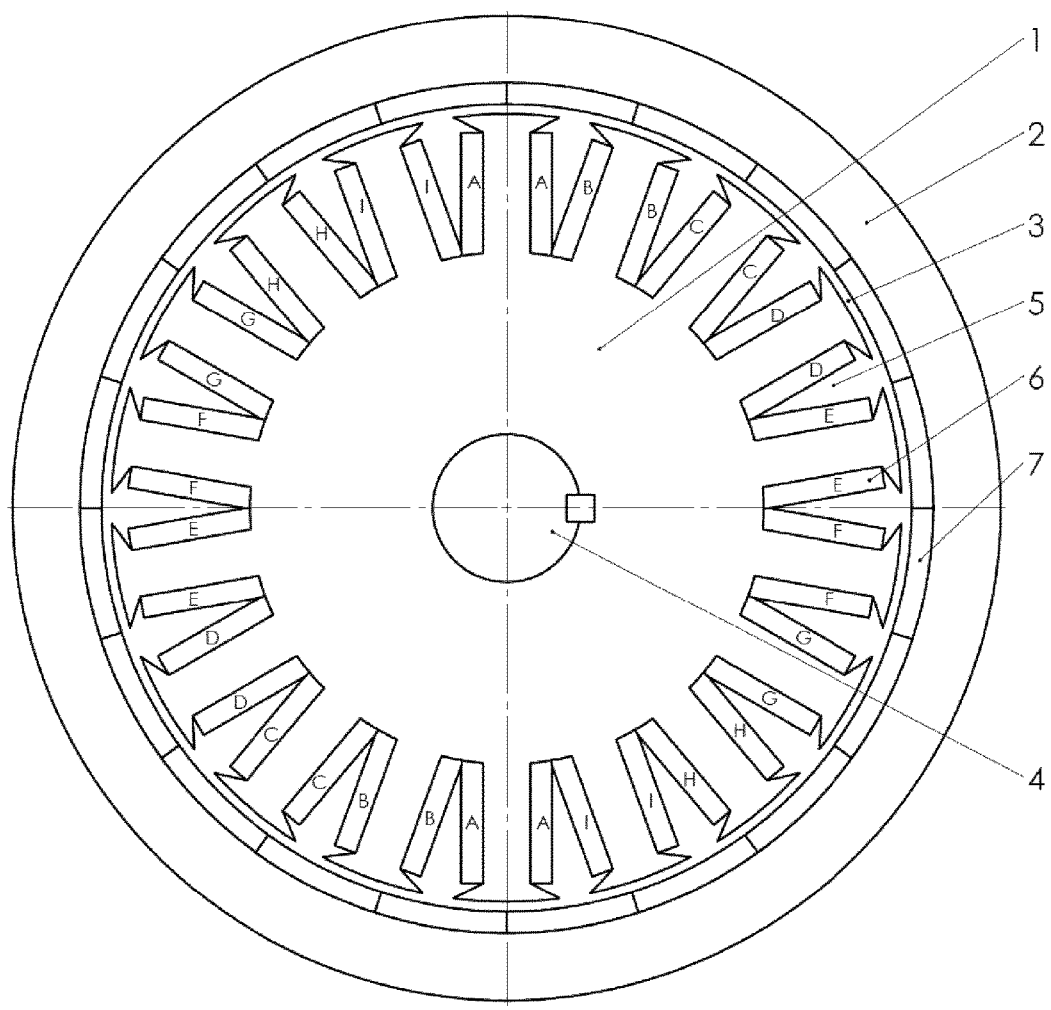
FIG. 1 schematically illustrates a multi-phase in-wheel electric motor in accordance with an embodiment of the present invention.

In the following description reference is made variously to an electric machine and to an electric motor. The term, "electric machine" is generally understood to cover both an electric motor and an electrical generator. In the context of the present invention, however, the term electric motor is not limited to an arrangement that converts electrical energy into motion, but is also intended to encompass an arrangement in which motion can generate power. The terms electrical machine and electrical generator are thus used interchangeably throughout this disclosure without any intended distinction in their meaning. Throughout the various figures referred to in the following description, like reference numerals have been used for like parts.

FIG. 1 depicts an electric machine suitable for in-wheel use, i.e. for installation in the wheel hub of an electrically driven vehicle. The machine comprises a fixed inner stator 1 and an outer rotor 2 which is rotatable around stator 1. Between the rotor 2 and stator 1 there is a small air gap 3. In the illustrated embodiment the rotor is arranged outside of the inner stator, however, it will be appreciated that the position of these elements can be inversed to provide an inner rotating rotor and outside fixed stator. The inner stator 1 is made of magnetic material and is attached to a shaft 4. At its outer circumference, the stator 1 is provided with a number of slots 5 in which are concentrated coil elements 6. The slots 5 essentially define protruding portions, around which a coil element 6 is disposed. In the illustrated embodiment the stator 1 has 18 slots 5 and is thus provided with 18 coil elements 6. Upon rotation of the rotor 20 about the stator, a voltage or emf is induced in each coil element 6 that is of a different phase to that induced in adjacent coil elements 6. In the illustrated embodiment, coil elements have induced voltages at nine different phases depicted by the letters A, B, C, D, E, F, G, H and I in FIG. 1. In addition, two coil elements 6 will have the same induced voltage phase. These two coil elements 6 are located at diametrically opposed positions on the stator. For example, referring to FIG. 1, the two coil elements A that have the same induced voltage phase are centered on the dot-dashed line that intersects the radius of the stator vertically. In the exemplary embodiment, the two elements 6 of each phase are connected together in serial, although a parallel connection is also possible. It will be understood that embodiments are possible in which all coil elements arranged on a stator will be driven at a different electrical phase. Similarly, embodiments are possible in which more than two coil elements are connected together and driven at the same electrical phase. For the purposes of this disclosure, each coil element or group of coil elements that carries the same electrical phase, either as a driving current or induced voltage, will be referred to as a phase winding 6.

The rotor 2 is also made of magnetic material, for example steel, and has 20 magnets 7 fixed on an inner surface. The magnets are arranged with alternating diametric polarity N-S and S-N and are spaced from one another by a very small gap. The number of magnets 7 is essentially a design choice however, it is important that the magnets 7 and coils can never align perfectly, as the motor could come to rest in a position in which no rotational forces are applied. In addition, cogging torque can be reduced by selecting the number of magnets that is close to the number of coil elements 6.

When the rotor 2 is made to rotate around the stator 1, such that the magnets 7 pass over the coil elements 6, a periodic induced voltage or emf is induced in the elements 6 as a result of magnetic flux changes. FIG. 2a shows the nine voltage signals, $U_A$, $U_B$, $U_C$, $U_D$, $U_E$, $U_F$, $U_G$, $U_H$ and $U_I$ that are induced in the phase windings 6 of each of the nine phases A to I over one electrical period as the rotor 2 moves around the stator 1. Several voltage periods occur over a full rotation of the rotor 2 about the stator. More specifically an electrical period corresponds to a rotational period/number of magnet pairs. As is apparent from FIG. 2a, the induced voltage has a periodic trapezoid shape that depends on the angular position of rotor 2. Taking as an example the induced voltage $U_A$ that appears on phase winding A, it can be seen from FIG. 2a that this has 0 V at the start of the period, i.e. at 0°, then increases linearly between 0° and 30° where it reaches a constant positive value. This value is retained up to 150° at which angle the induced voltage decreases linearly up to 210°, whereafter a constant negative value is reached. This value is maintained up to a 330° after which the voltage increases linearly to reach 0 V at the end of the period at 360°. Each subsequent phase winding carries a voltage phase that is shifted by 200° (i.e. by an absolute value of 20° and inversed), such that the induced voltage on phase winding B decreases between angular positions 20° to 50° at which position it reaches a constant negative value. In general the phase shift between phases of geometrically adjacent phase windings can be defined as 180°+180°/m, where m is the number of phases. Thus, for a motor having 6 phases, the phase offset between adjacent phase windings would be 210° and for a motor with 12 phases, the phase offset would be 195°.

While in the illustrated embodiment, the induced voltage is essentially trapezoidal in shape, this depends on a number of known factors, including the size and shape of magnets, the stator geometry, the type of windings, etc, so that one of ordinary skill in the art would be able to modify the machine to achieve a different induced voltage waveform by altering elements of the design.

In order to cause rotation of the electric motor, each phase winding 6 must be energized by current flow in the correct sequential manner. An ideal current waveform would have the same shape and sign as the induced voltage illustrated in FIG. 2a, but a rectangular waveform is more commonly used in a simple current control as it is simpler to achieve. FIG. 2b shows representative current waveforms, $I_A$, $I_B$, $I_C$, $I_D$, $I_E$, $I_F$, $I_G$, $I_H$ and $I_I$ that are supplied to each of the coil windings A to I. Note that as a result of the rectangular waveform, each phase current has a constant value for ⅔ of the whole period at positions corresponding to a peak in the induced voltage, but zero during the remaining ⅓ of the period. Taking as an example the current supplied to the first phase, $I_A$ has a value of zero from 0° to 30°, then a constant positive value, $I_0$ from 30° to 150°, zero again from 150° to 210°, a constant negative value, $-I_0$, from 210° to 330° and finally zero between 330° and 360°. The current waveform for each subsequent phase is shifted by 200° (i.e. by 20° and inverted).

By distributing the current over nine phases in this manner, it is possible to provide a suitable current switching sequence for control of the motor with minimum torque ripple. More generally, it has been observed that by employing multiples of three phases, but at least six phases, it is possible to reduce the torque ripple by several factors when compared to motors using three or fewer phases. In addition, the control of the current waveforms can be achieved in a particularly simple fashion as is described below.

Figure 3:
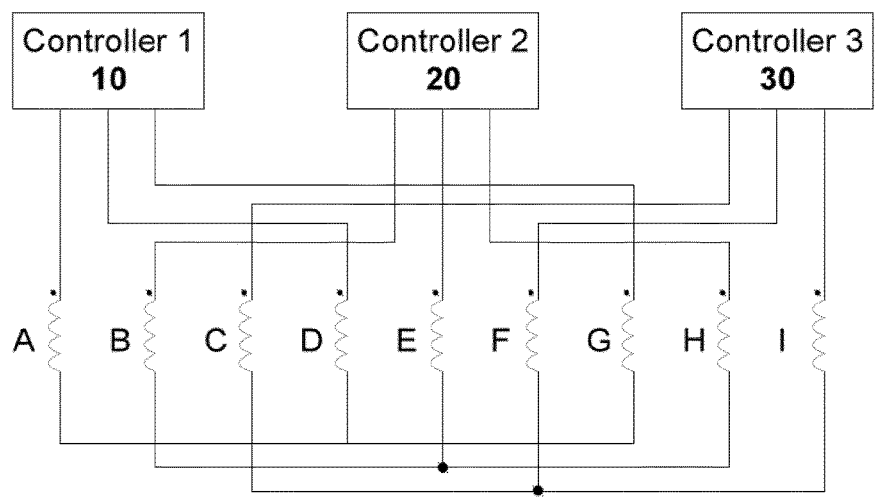

Referring to FIG. 3, there is shown a schematic illustrating the current control for the various winding phases. In accordance with the present invention, the control or driving current through the various phase windings 6 is effected using independent control modules 10, each controlling three different phases. As shown in FIG. 3, three controls modules 10 are illustrated, each being connected to three phase windings, that are driven by three different current phases. The three phase windings are selected such that currents and the induced phase voltages between the phase windings are shifted relative to one another by 120°. It will be recognized that the geometrical sequence of phase currents shown in FIG. 2b is not the same as in the electrical domain. In the electrical domain, the nine phases are shifted sequentially by 40° (i.e. 360° divided by the number of phases). Using the current references in FIG. 2b, the current phases have an electrical phase sequence of $I_A$, $I_C$, $I_E$, $I_G$, $I_I$, $I_B$, $I_D$, $I_F$ and $I_H$. Thus a first three-phase control module (controller 1) 10, controls the current for phases A, G and D. The second control module 10 (controller 2) controls current for phases B, H and E while the third control module 10 (controller 3) controls the current for phases C, I and F. The 3 phase windings connected to each control module 10 is shown in a wye configuration. However, it is also possible to connect them in a delta configuration. The orientation of each coil is illustrated by a dot in FIG. 3, but also in FIGS. 2 and 4. By selecting three phases that shifted relative to one another by 120° it is possible to utilize a simple three phase control strategy commonly employed for Brushless DC electric motors (also known as BLDC motors) where at any time only two phases are conducting. This can be better understood with reference to FIG. 2b. When considering the current waveforms driving phase windings 6 A, G and D it is clear that at any single angular position, one of the phase windings 6 will have an applied current of zero, while the remaining two will be driven by peak currents of opposite polarity. For example, taking the angular position of 180°, phase winding A receives no drive current, phase winding D has a positive drive current and phase winding G has a negative drive current. Clearly this does not apply when more complex waveforms are used, such as trapezoidal or sinusoidal but is achievable for rectangular waveforms.

This modular approach of controlling the phase winding current can be applied to any multi-phase configuration where the number of phases is a multiple of 3, i.e. m=k*3, where k is an integer greater or equal to 2 and m is the number of phases. Thus this modular 3-phase control can be applied when using 6, 9, 12, 15, 18 or more phases, for example. More generally, for m phase windings with a phase shift of 360°/m, k control modules are required. Moreover, each of the k control modules will control coil windings i, i+m/3, i+m*⅔, where i is an integer satisfying 1≤i≤k. Applying this to the exemplary embodiment of FIG. 1, a first control module 10 controls the $1^{st}$, $4^{th}$ and $7^{th}$ coil winding 6, which corresponds to A, D and G. The second control module 10 controls the $2^{nd}$, $5^{th}$ and $8^{th}$ phase winding, which corresponds to B, E and H, while the third control module 10 controls the $3^{rd}$, $6^{th}$ and $9^{th}$ phase windings, which corresponds to C, F and I.

Although in the exemplary embodiment, the drive currents have a rectangular waveform, it will be appreciated that other periodic functions may be used for the controlling current in each 3-phase control modules 10 in order to adapt these to other magnetic motors, including, but not limited to, a trapezoidal waveform and sinusoidal waveform. Each control module 10 can be controlled independently of the others.

While the control module 10 illustrated in FIG. 3 is shown connected to only three phase windings, it should be understood that each illustrated coil is intended to represent all phase windings driven by the same current phase.

Figure 4:
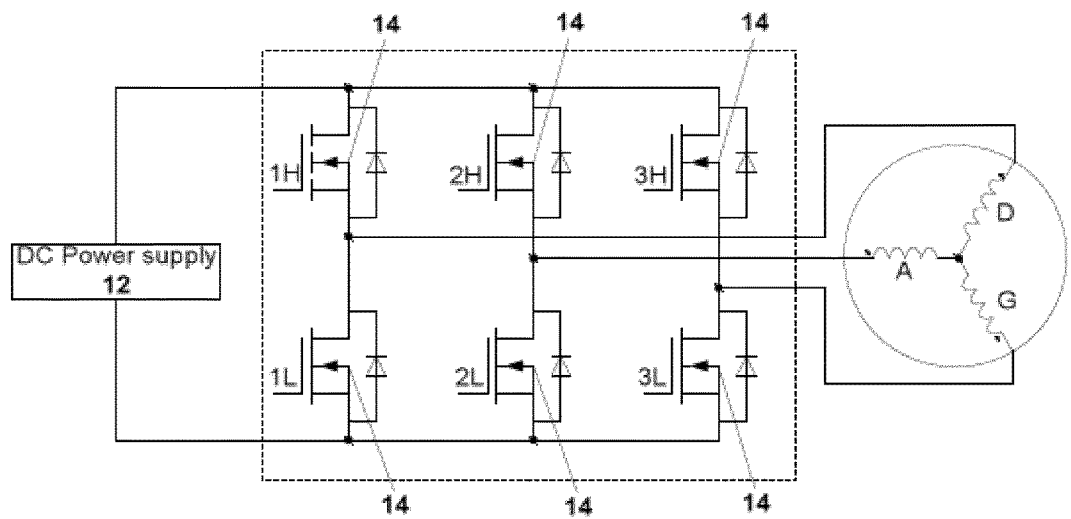

A single three-phase control module 10 is depicted in FIG. 4. As illustrated more clearly in FIG. 4, the three coil windings A, D and G are connected together in a wye configuration (Y-configuration). In order to control the current for the three phases, the control module comprises six semiconductor switching elements 14 arranged in a half-bridge configuration and connected to a DC power supply 12. In the illustrated embodiment, these switching elements are Metal Oxide Semiconductor Field Effect Transistors (MOSFET) although other semiconductor technology can be used, such as Insulated Gate Bipolar Transistors (IGBT). The switching elements 14 are controlled by logic signals 1L, 1H, 2H, 2L, 3H, 3L provided by an external control unit (see FIG. 5). The structure and function of this type of 3-phase control module is well known in the field of electric motor control and will not be explained in detail here. In essence, the control signals act to operate the switches in pairs to connect two branches of the coil windings to the DC power supply at a time. Each switch 14 is in operation for one third of the time.

Figure 5:
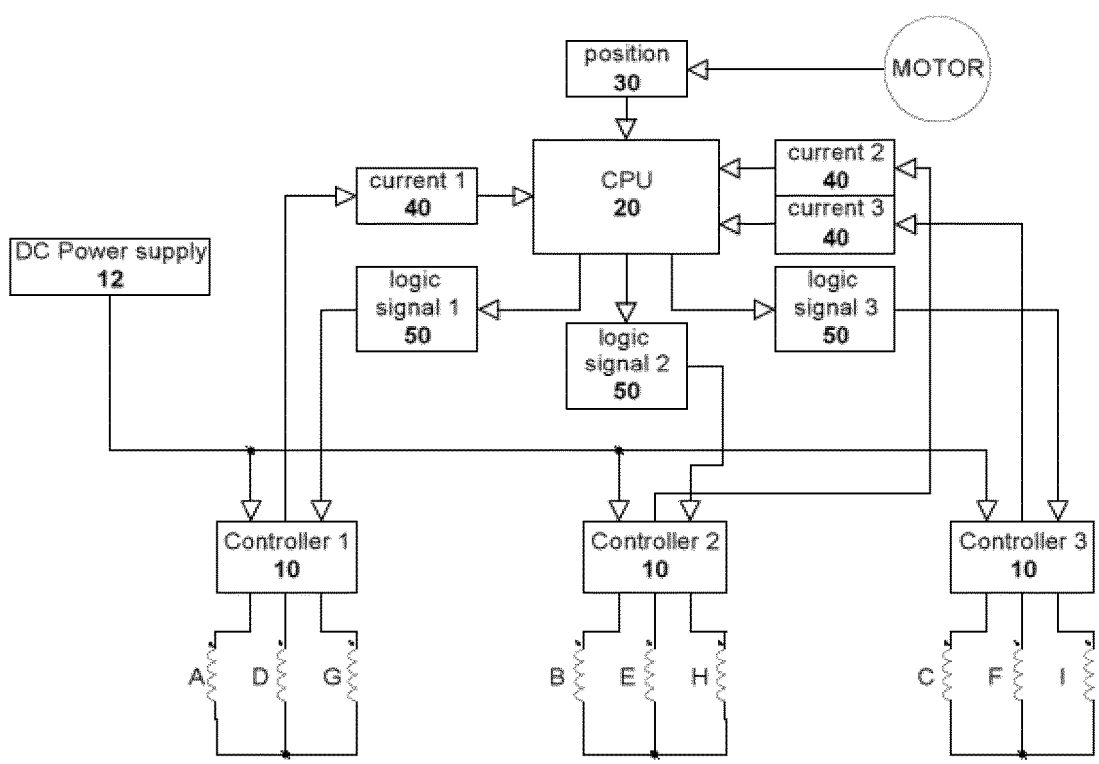

The control signals for each of the switching elements 100 are provided by a processing unit 20 (CPU) as shown on FIG. 5. The processing unit 20 has various interfaces 30, 40, 50 via which signals are received from or transmitted to various elements in the motor or control modules 10. More specifically, the processing unit 20 receives position data from the motor via a position data interface 30. This position data indicates the orientation of the rotor 2 relative to the stator 1. The processing unit 20 further receives data on the current measured in each control module 10 via current data interface 40. By virtue of the simple 3-phase control effected in each control module only a single phase current, i.e. the current through any single winding, need be determined. In the event that a trapezoidal or other periodic current phase waveform is use, at least two phase currents in each module has to be measured. Finally, the processing unit 20 sends control signals to each control module 10 via the current control interface 50. Based on the measured position obtained via the position data interface and the measured current in each module obtained via the current data interface 40, processing unit 20 sends control signals to each control module 10 via the current control interface 50 in order to achieve the required sequence of phase current switching and magnitude of phase current. A common control strategy of fast switching of switching elements is applied, such as pulse wave modulation (PWM).

The use of modular control modules and a common processing unit means that a significant reduction in hardware is achieved for multi-phase motor drives. Moreover, by the proper selection of phases it is possible to control any multiple of 3 phases, in a very simple fashion yet achieve optimum current distribution in a low-voltage electric motor.

While in the exemplary embodiment, a single common processing unit 20 or controller is provided for controlling the operation of all control units 10, it will be understood that this function can be implemented by individual dedicated controllers arranged to control one or more control units in response to position signals and the measured current.

As explained with reference to FIGS. 1 and 3, the sequential arrangement of phase windings A-I is not the same as the order of the phases in the electrical domain. However, the present invention is not limited to the specific geometrical arrangement shown in the exemplary embodiment. Rather the phase windings may be configured in a sequence that represents an increasing phase shift in the electrical domain, or in another arrangement.

It should be understood that the invention is not limited to the precise embodiment shown and the above described arrangement can be applied to a range of different electric machines, including, but not limited to, PSMS electric machine, reluctance machines and linear electric motors.

REFERENCE NUMERALS

1. Stator
2. Rotor
3. Air gap
4. Bearing shaft
5. Slot
6. Phase winding
7. Magnet
10. Control module
12. DC Power supply
14. Switching element
20. CPU unit
30. Position data interface
40. Current data interface
50. Current control interface

The invention claimed is:

1. A multi-phase electric motor, comprising:
a rotor; and
a stator,
wherein the rotor comprises a plurality of magnets directed towards the stator,
wherein the stator comprises a plurality of phase windings arranged around a circumferential surface of the stator and directed towards the magnets,
wherein the phase windings are connected to control units configured to selectively apply a current to the phase windings so as to induce an electromagnetic force which acts upon the magnets of the rotor to effect a rotation of the rotor,
wherein the motor further comprises at least two control units, each control unit being configured to control the supply of current to three of the phase windings such that a different phase current is supplied to each of the three phase windings with a phase shift between the different phase currents being 120°,
wherein each control unit utilizes a different current phase than the other control units,
wherein the phase windings are driven by one of m different current phases, where m is a multiple of 3 and at least equal to 6, and wherein the phase shift between current phases is 360°/m,
wherein the arrangement of phase windings around a circumferential surface of the stator is such that each phase winding is driven by a current that is shifted in phase by 180°+180°/m relative to the current in an adjacent phase winding, where m is the total number of phase currents.

2. The multi-phase electric motor of claim 1, wherein for k control units controlling the supply of a total of m phase currents to m phase windings arranged in sequence 1 to m around the circumferential surface of the stator, each of the k control units is configured to control phase windings i, i+m/3, and i+m*2/3, where i is an integer satisfying $1 \leq i \leq k$.

3. The multi-phase electric motor of claim 1, wherein the three phase windings controlled by each control unit are arranged in Y-configuration.

4. The multi-phase electric motor of claim 1, wherein the three phase windings controlled by each control unit are arranged in a delta configuration.

5. The multi-phase electric motor of claim 1, wherein each control unit comprises a 3-phase half bridge circuit configured to energize the phase windings.

6. The multi-phase electric motor of claim 5, wherein each 3-phase half bridge circuit is configured to energize the phase windings with a substantially rectangular current waveform.

7. The multi-phase electric motor of claim 5, wherein each 3-phase half bridge circuit is configured to energize the phase windings with a substantially trapezoidal or sinusoidal current waveform.

8. The multi-phase electric motor of claim 1, further comprising at least one controller configured to control operation of at least one of the control units.

9. The multi-phase electric motor of claim 8, wherein the at least one controller is configured to control the operation of each control unit.

10. The multi-phase electric motor of claim 8, wherein the at least one controller is configured to utilize pulse width modulation.

11. The multi-phase electric motor of claim 1, wherein each phase winding comprises one or more coil elements connected in series or in parallel.

12. The multi-phase electric motor of claim 11, wherein each phase winding comprises at least two coil elements that are distributed evenly around the circumferential surface of the stator.

13. An electrically powered vehicle with at least one wheel, the electrically powered vehicle comprising the multi-phase electric motor of claim 1.

* * * * *